(12) United States Patent
Loudrup (10) Patent No.: US 11,072,400 B2
(45) Date of Patent: *Jul. 27, 2021

(54) HOUSING UNIT

(71) Applicant: UDVIKLING DANMARK A/S, København K (DK)

(72) Inventor: Kim Loudrup, Klampenborg (DK)

(73) Assignee: UDVIKLING DANMARK A/S, København K (DK)

( * ) Notice: Subject to any disclaimer, the term of this patent is extended or adjusted under 35 U.S.C. 154(b) by 0 days.

This patent is subject to a terminal disclaimer.

(21) Appl. No.: 16/182,677

(22) Filed: Nov. 7, 2018

(65) Prior Publication Data

US 2019/0071154 A1    Mar. 7, 2019

Related U.S. Application Data

(63) Continuation of application No. 15/401,550, filed on Jan. 9, 2017, now Pat. No. 10,131,409.

(51) Int. Cl.
| | |
|---|---|
| B63B 35/44 | (2006.01) |
| E04B 1/76 | (2006.01) |
| E04H 1/00 | (2006.01) |
| B65D 88/02 | (2006.01) |
| B65D 88/74 | (2006.01) |
| E04H 1/12 | (2006.01) |
| E04B 1/343 | (2006.01) |
| E04H 1/04 | (2006.01) |

(Continued)

(52) U.S. Cl.
CPC ............ *B63B 35/44* (2013.01); *B65D 88/022* (2013.01); *B65D 88/74* (2013.01); *B65D 90/008* (2013.01); *E04B 1/34336* (2013.01); *E04B 1/34823* (2013.01); *E04B 1/34861* (2013.01); *E04B 1/7675* (2013.01); *E04H 1/005* (2013.01); *E04H 1/04* (2013.01); *E04H 1/1205* (2013.01); *B63B 2035/4426* (2013.01); *E04H 2001/1283* (2013.01)

(58) Field of Classification Search
CPC ............ B63B 35/44; B63B 2035/4426; E04B 1/7675; E04B 1/34336; E04H 1/1205; E04H 2001/1283; B65D 90/008; B65D 88/74; B65D 88/022
USPC ........... 52/36.1, 33, 79.1; 114/264, 266, 267
See application file for complete search history.

(56) References Cited

U.S. PATENT DOCUMENTS

| | | | | |
|---|---|---|---|---|
| 2,565,369 | A | * | 8/1951 | Hamilton ................ B63B 35/38 114/266 |
| 3,665,882 | A | * | 5/1972 | Georgiev ................ B63B 35/34 114/266 |

(Continued)

OTHER PUBLICATIONS

Christine Walsh: "Jetson Green—Boathouse Made From Shipping Containers", Jan. 27, 2014, URL:https://www.jetsongreen.com/2014/01/boathouse-made-from-shipping-containers.html, retrieved from the internet on Oct. 30, 2020 (Year: 2014).*

*Primary Examiner* — Anthony D Wiest (74) *Attorney, Agent, or Firm* — Nordic Patent Service (57) ABSTRACT

A housing arrangement for floating on water is provided with a plurality of interconnected pontoons—The pontoons have a polygon outline. A plurality of shipping containers are arranged on each of the pontoons. The shipping containers are habitable by providing at least one door and at least one window in the shipping containers and by insulating the walls of the shipping containers. A plurality of gangways interconnects the pontoons.

18 Claims, 7 Drawing Sheets

(51) Int. Cl.
 *E04B 1/348* (2006.01)
 *B65D 90/00* (2006.01)

(56) References Cited

U.S. PATENT DOCUMENTS

| | | | | |
|---|---|---|---|---|
| 3,791,080 | A * | 2/1974 | Sjoberg | B63B 3/08 52/79.4 |
| 4,091,581 | A * | 5/1978 | Abbott | B63B 29/025 52/79.1 |
| 4,599,829 | A * | 7/1986 | DiMartino, Sr. | E04B 1/3483 410/79 |
| 4,606,673 | A * | 8/1986 | Daniell | B63B 22/021 114/256 |
| 5,421,282 | A * | 6/1995 | Morris | B63B 35/34 114/264 |
| 5,848,536 | A * | 12/1998 | Dodge | B63J 2/04 62/240 |
| 7,603,959 | B1 * | 10/2009 | Veazey | B63B 3/08 114/263 |
| 9,643,693 | B2 * | 5/2017 | Kim | B63B 39/005 |
| 2011/0072735 | A1 * | 3/2011 | Lupattelli | A61H 33/066 52/79.5 |
| 2016/0083052 | A1 * | 3/2016 | Valtanen | B63B 35/34 114/256 |

* cited by examiner

HOUSING UNIT

CROSS-REFERENCE TO RELATED APPLICATIONS

This application is a continuation of U.S. patent application Ser. No. 15/401,550, filed on Jan. 9, 2017, the disclosure of which is incorporated herein by reference in its entirety.

STATEMENT REGARDING PRIOR DISCLOSURES BY THE INVENTOR OR A JOINT INVENTOR (37 C.F.R. § 1.77(B)(6)

Danish Patent Application No. PA210400722 was filed on 12 Dec. 2014 and granted on 29 Feb. 2016. The inventor in Danish Patent Application No. PA210400722 is Kim Loudrup, the inventor of the instant application and the Applicant is UDVIKLING DANMARK A/S.

European Patent Application No. 15199783.0 was filed on 14 Dec. 2015 and published on 15 Jun. 2016. The inventor in European Patent Application No. 15199783.0 is Kim Loudrup, the inventor of the instant application and the Applicant is UDVIKLING DANMARK A/S.

TECHNICAL FIELD

The present disclosure relates to a housing unit that provides for comfortable, inexpensive and environmental friendly accommodation that can be provided at relatively short notice and for relatively low costs. In particular, the present disclosure relates to the use of shipping containers for creating living space.

BACKGROUND

WO 2014/195559 discloses a pontoon platform constructed from at least one container or plurality of interconnected containers, such as shipping or standard freight containers. At least some of the containers are adapted to float on water, either they are waterproof containers or they comprise a float arrangement. The floating containers form pontoons and a platform is provided to interconnect several pontoons. Residential containers are placed on the platform in a U-shaped arrangement.

There is a need for comfortable, inexpensive and environmental friendly housing space that can be provided at short notice. Various housing concepts have tried to address this need in the past. Prefabricated housing is one of them. Trailers are also used to create housing space at short notice. Shipping containers have been converted to housing space. However, none of these concepts has been able to fulfill all of the above indicated requirements of comfort, cost and environmental friendliness. Prefabricated housing is typically too expensive. Trailer homes do not provide the required level of comfort and environmental friendliness due to inadequate insulation, ventilation and robustness. Shipping containers have been converted to be habitable in the past. However, providing a site for building a housing arrangement from shipping containers at short notice is often problematic. Further, known housing arrangement constructed from shipping containers have typically been modest in their aesthetic aspirations and their configuration has many been simple cuboid constructions with little architectural inspiration.

SUMMARY

On this background, it is an object to provide housing concept that at least partially fulfills the above object.

This object is achieved in accordance with a first aspect by providing a housing arrangement for floating on water, the housing arrangement comprising a plurality of interconnected pontoons, the pontoons have a polygon outline, a plurality of shipping containers arranged on each of the pontoons, the shipping containers being adapted to be habitable by providing at least one door and at least one window in the shipping containers and by insulating the walls of the shipping containers, and a plurality of gangways interconnecting the pontoons.

By arranging a plurality of shipping containers that have been adopted to be habitable on a pontoon that can be floated near shore, it becomes possible to quickly provide inexpensive, environmentally friendly and comfortable living space. A placing the adapted shipping containers on a pontoon the housing unit can quickly be relocated and can be flexibly located in relation to acute need. Due to the great availability of shipping containers is possible to produce the living space at short notice for relatively low cost. The housing unit can be uses as temporary or permanent housing, or as hotel, office or school.

In a first possible implementation of the first aspect at least one of the pontoons is provided with a gangway for connection to shore.

In a second possible implementation of the first aspect at least several of the pontoons are provided with paths interconnecting the gangways so as to form pathway or pathway system that connects each of the pontoons to shore.

In a third possible implementation of the first aspect each pontoon has three or more of the shipping containers placed thereon in an arrangement with an atrium formed inside the first polygon arrangement at least a portion of the pathway is part of atria formed on each pontoon inside the first polygon arrangement.

In a fourth possible implementation of the first aspect the pontoons have a flat top and wherein the pontoons have a plurality of flat sides giving the pontoons a pentagon or a hexagon shaped outline.

In a fifth possible implementation of the first aspect the plurality of shipping containers being arranged on the flat top.

In a sixth possible implementation of the first aspect the pontoons have an identical polygon outline.

According to a second aspect there is provided a housing unit for floating on water, the housing unit comprising a pontoon formed by a single hollow body with a flat top, the pontoon having a plurality of flat sides giving the pontoon a pentagon or a hexagon shaped outline, three or more shipping containers arranged on the flat top, the shipping containers having been adapted to be habitable by providing at least one door and at least one window in the shipping containers and by insulating the shipping containers.

In a first possible implementation of the second aspect the inner sides of the walls, roof and/or floor of the shipping containers are insulated using reflective insulation sheets or panels that comprise at least two reflective layers, one reflective layer on each outer surface with another type of insulating material sandwiched between the reflective layers.

In a second possible implementation of the second aspect the other insulating material is an air bubble film layer and/or a plastic foam layer.

In a third possible implementation of the second aspect the pontoon comprises a heat pump heat exchanging with the water surrounding the pontoon, directly or indirectly.

In a fourth possible implementation of the second aspect the interior of the pontoon is accessible and comprises at least one room.

In a fifth possible implementation of the second aspect the pontoon comprises a staircase accessible through an opening in the flat top.

According to a third aspect there is provided a housing unit for use on a floating pontoon, the housing unit comprising a plurality of shipping containers, the shipping containers being adapted to be habitable by providing at least one door and at least one window in the shipping containers and by insulating the walls of the shipping containers, wherein inner sides of the walls, roof and/or floor of the shipping containers are insulated using reflective insulation sheets or panels that comprise at least two reflective layers, one reflective layer on each outer surface with another type of insulating material sandwiched between the reflective layers.

In a first possible implementation of the third aspect the other insulating material is an air bubble film layer and/or a plastic foam layer.

In a second possible implementation of the third aspect the insulation comprises a core layer of plastic foam with an air bubble layer on both sides of the core layer and a plurality of reflective layers, with at least a reflective layer on the outer sides.

In a third possible implementation of the third aspect the shipping containers are provided with floor heating.

In a fourth possible implementation of the third aspect the floor heating is a water based underfloor floor heating.

Further objects, features, advantages and properties of the housing unit and arrangement with a plurality of housing units according to the present disclosure will become apparent from the detailed description.

BRIEF DESCRIPTION OF THE DRAWINGS

In the following detailed portion of the present description, the housing unit and the arrangement with a plurality of housing units will be explained in more detail with reference to the drawings, in which.

DETAILED DESCRIPTION

Below follows a description a housing unit 1 and open arrangement including a plurality of housing units.

In the below description, a pontoon, is understood as a flotation device with buoyancy sufficient to float itself as well as a heavy load and shipping container is understood as a standardized steel shipping container, i.e. am intermodal freight container.

Shipping containers have a strength suitable to withstand shipment, storage, and handling. In the context of international shipping trade, "container" or "shipping container" is virtually synonymous with "(standard) intermodal freight container" (a container designed to be moved from one mode of transport to another without unloading and reloading).

An intermodal container (also container, freight container, ISO container, shipping container, hi-cube container, box, conex box and sea can) is a standardized reusable steel box. Shipping containers are generally used to store and move materials and products in the global containerized intermodal freight transport system efficiently and securely. "Intermodal" indicates that the container can be moved from one mode of transport to another (from ship, to rail, to truck) without unloading and reloading the contents of the container. Lengths of containers, which each have a unique ISO 6346 reporting mark, vary from 8 to 56 feet (2.438 to 17.069 m) and heights from 8 feet (2.438 m) to 9 feet 6 inches (2.896 m). There are about 17 million intermodal containers in the world of varying types to suit different cargoes.

A typical steel shipping container has doors fitted at one end, and is made of corrugated weathering steel. Standard steel shipping containers can be 8-foot (2.44 m) wide by 8-foot (2.44 m) high, and either a nominal 20-foot (6.1 m) or 40-foot (12.19 m) long. They can be stacked up to seven units high. At each of the eight corners are castings with openings for twistlock fasteners.

A typical steel shipping container is made of corrugated sheet steel walls that are welded to the main structural top and bottom side rails and end frames that are of fabricated or shaped steel sections. The end frames have fittings (steel castings) at all eight corners that are usually welded to the four corner posts, top and bottom side and front rails, and rear doorsill and header. The roof can be flat or corrugated sheet steel welded to the top side and end rails and door header; it may have interior roof bows for support. The doors are usually steel or plymetal (steel-faced wood) panels fitted with locking and antirack hardware and weatherproof seals. The floor of most intermodal shipping containers is marine grade plywood, but floor may be soft or hard laminated wood, planking, or plywood either screwed or bolted to the cross members.

Figure 1:
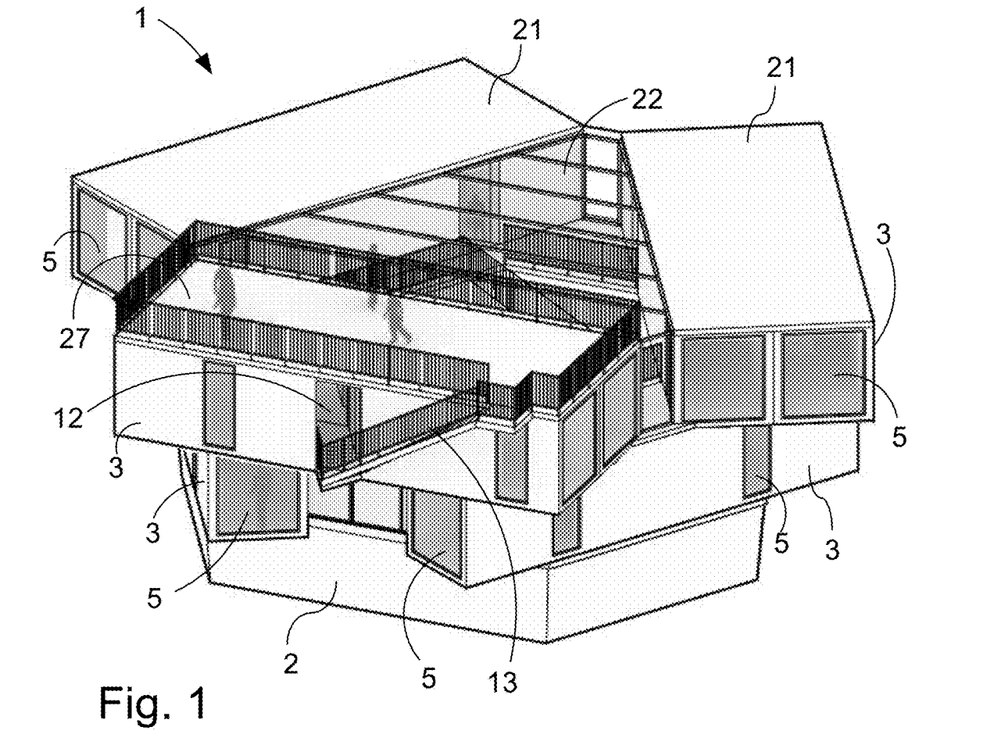
FIG. 1. is an elevated view of a housing unit.
Figure 2:
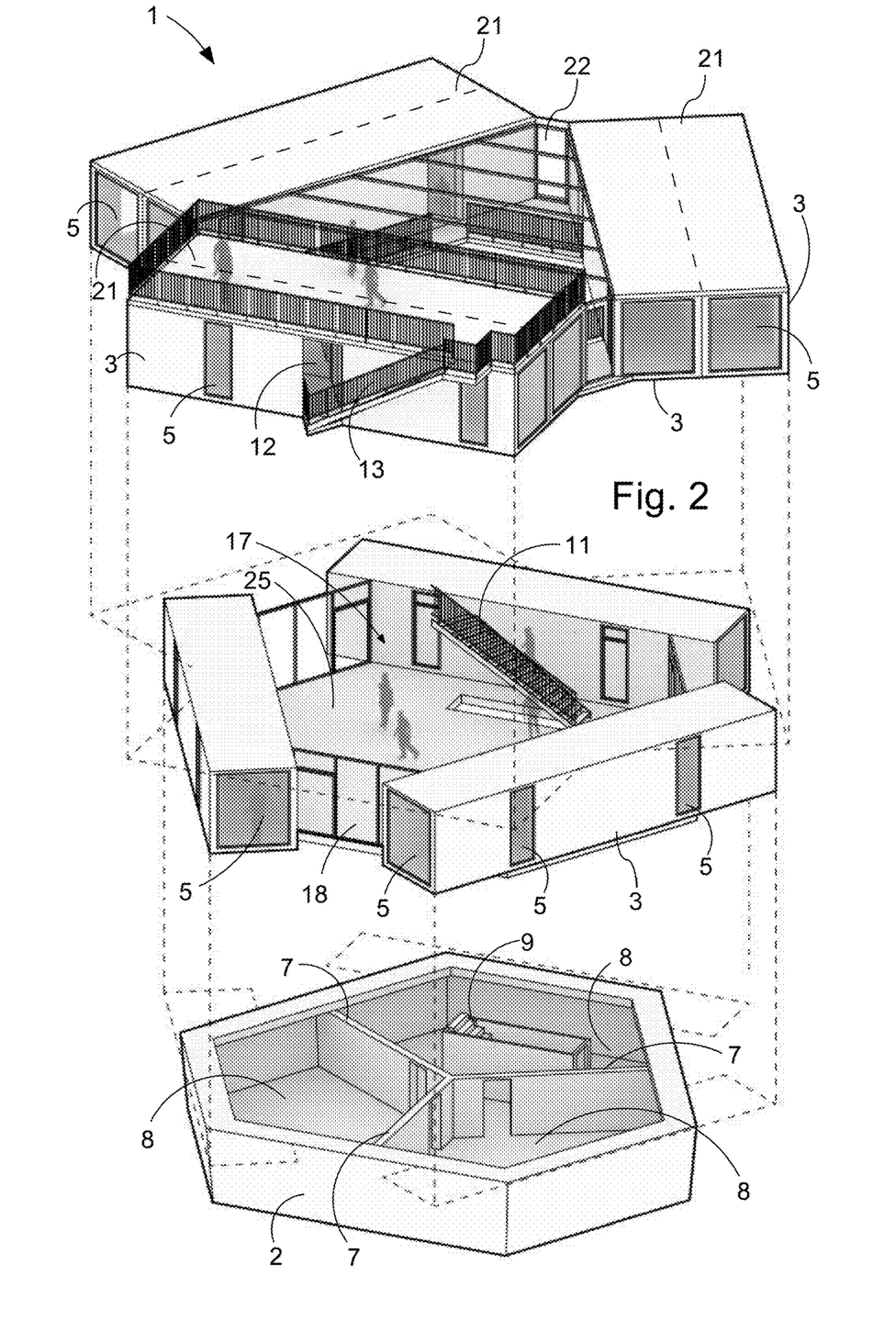
FIG. 2 is an exploded view of the housing unit of FIG. 1.

FIGS. 1 and 2 show a housing unit 1 in a perspective and a perspective exploded view respectively. The housing unit 1 does not need to be motorized, because it is usually moored, kept stationary at a fixed point and often tethered to land to provide utilities. The housing unit 1 includes a pontoon 2 with a plurality of shipping containers 3 arranged on top of the upper surface of the pontoon 2. The shipping containers 3 have been adapted to be suitable for housing purposes, i.e. have been converted to be habitable for providing living space. By way of example, the shipping containers 3 have been stacked on the pontoon 2 in two layers, but it should be understood that the shipping containers 3 may just as well have been stacked in a single layer or the stacked in more than two layers.

Figure 3:
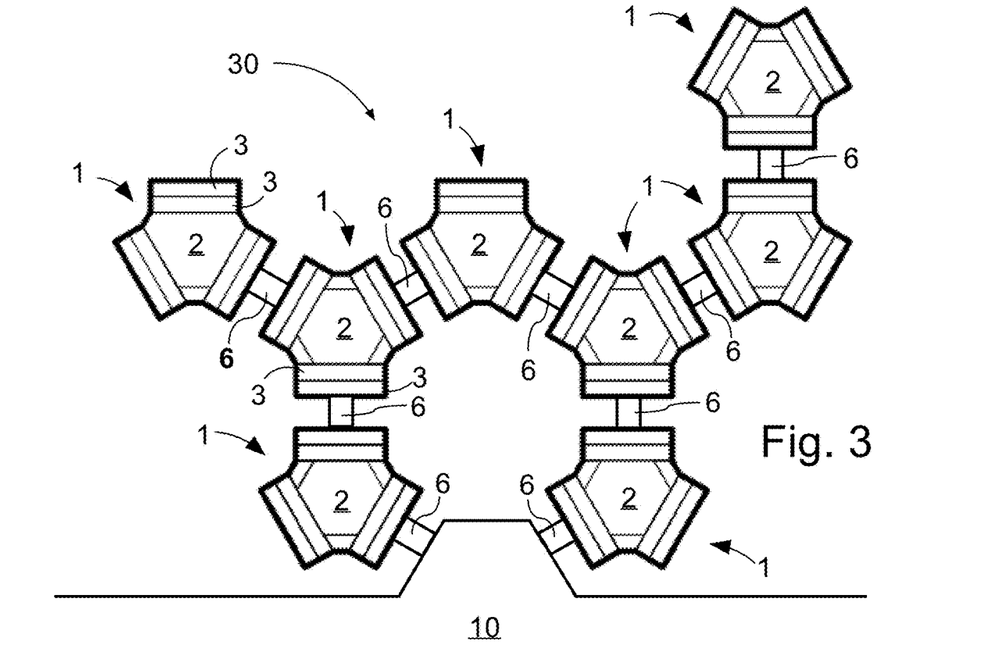
FIG. 3 is a top view of an arrangement including a plurality of interconnected housing units of FIG. 1 near a shore.

FIG. 3 illustrates a plurality of interconnected housing units 1 in an example configuration flowing of the shore 10. The housing units 1 are interconnected by gangways 6. The connection of the plurality of interconnected housing units to shore is also established by gangways 6.

Figure 4:
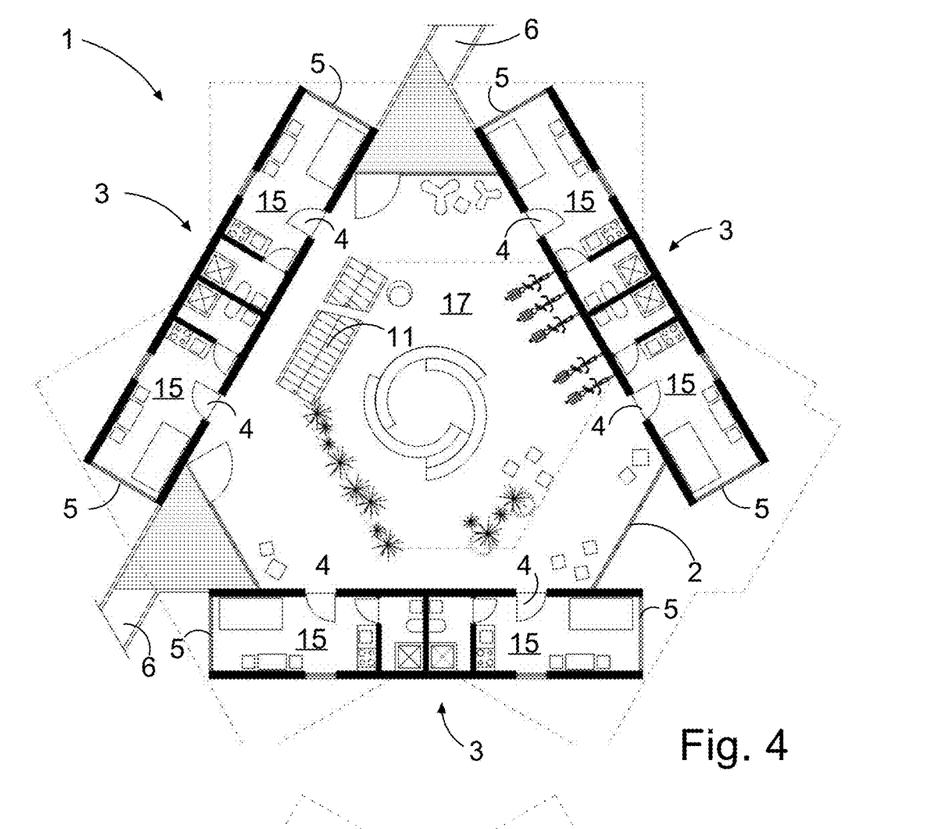
FIG. 4 is a top sectional view of the housing unit of FIG. 1.

FIG. 4 illustrates in a top view the layout of a first layer of shipping containers 3 placed in a first polygon arrangement on the top surface of the pontoon 2 with an atrium area 17 in the center of the first polygon arrangement. The first polygon arrangement may have equal length sides. In this example the polygon is a triangle. It is noted that the shipping containers 3 are spaced and the space between them can be filled with glazing or walls. Thus, the shipping containers 3 are arranged in an imaginary polygon and do not form an exact polygon. The space between the shipping containers 3 can also be used as a passage. The layout of a second layer of shipping containers 3 placed on the first layer of shipping containers is illustrated by the interrupted lines.

Figure 5:
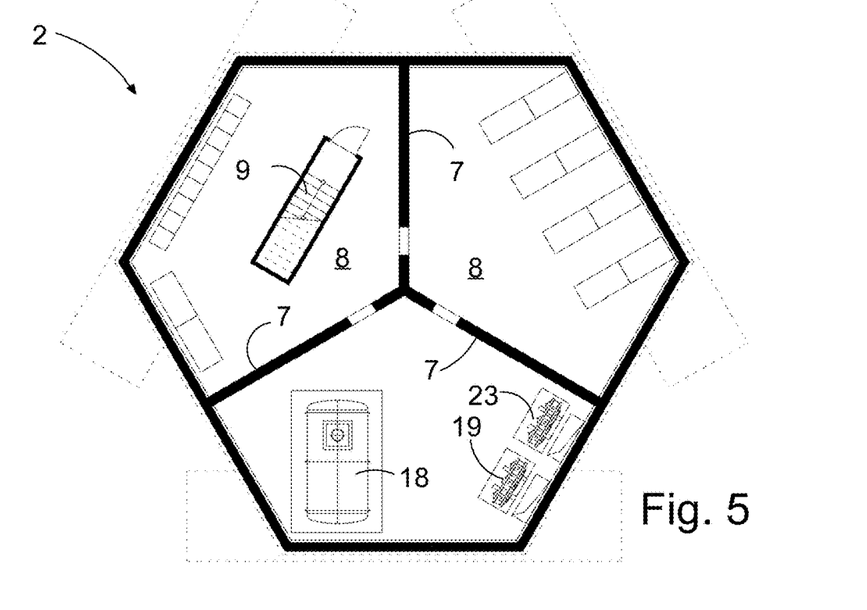
FIG. 5 is another top sectional view of the housing unit of FIG. 1.

FIG. 5 illustrates in a top view the shape and construction of the pontoon 2. The layout of the first layer of shipping containers 3 placed on the pontoon 2 is illustrated by the interrupted lines.

Figure 6:
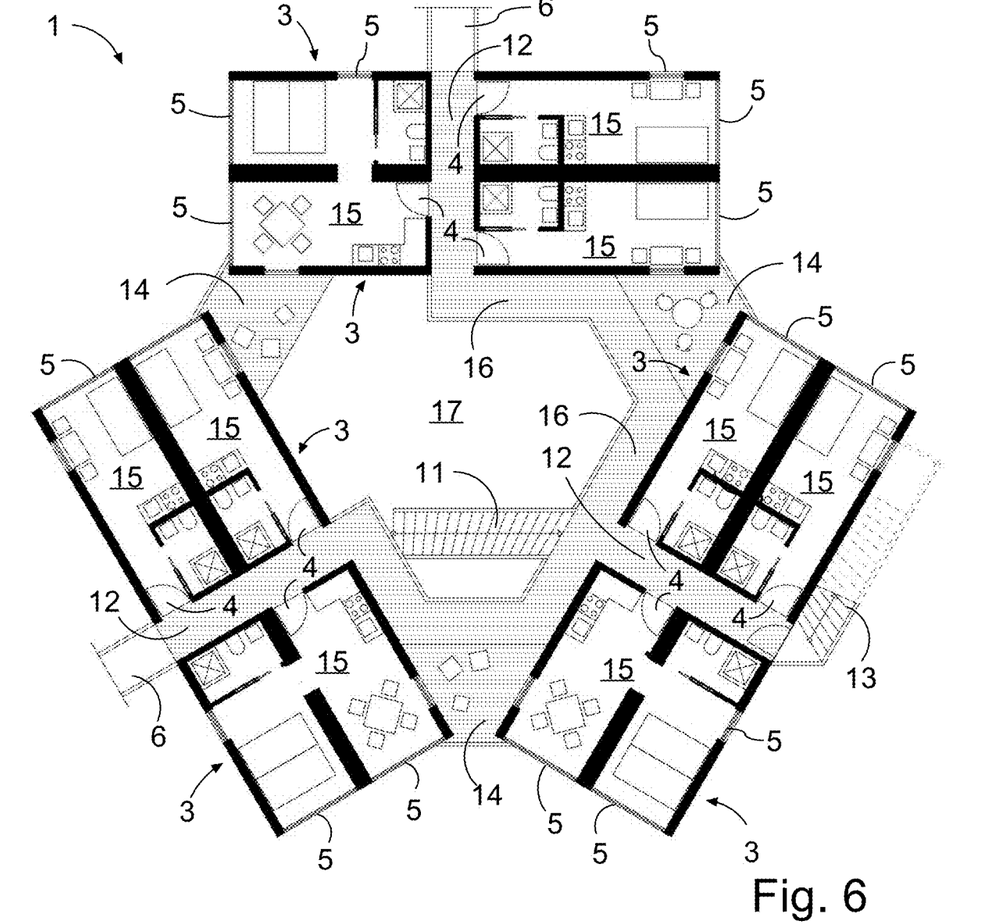
FIG. 6 is another top sectional view of the housing unit of FIG. 1.

FIG. 6 illustrates in a top view the layout of a second layer of shipping containers 3 placed in a second polygon arrangement on the first layer of shipping containers 3 with the atrium 17 also been surrounded by the containers 3 of the second polygon arrangement.

The pontoon 2 is a raft-like platform with a substantially flat upper surface for supporting the shipping containers 3 arranged thereon. The pontoon 2 can be anchored, typically close to shore 10, and the pontoon 2 provides enough buoyancy for the complete housing unit 1 when the housing unit 1 is floated. The pontoon 2 can be made from various materials, one suitable material being concrete, such as steel reinforced concrete. In an embodiment, the interior of the pontoon 2 is be divided by partition walls 7 into several rooms 8 and the pontoon 2 is optionally provided with a staircase 9 that connects the upper surface of the pontoon 2 to the bottom floor of the pontoon 2. A floor 25 covers the top of the pontoon 2 in order to provide a flat top surface that serves e.g. to support the shipping containers 3 placed thereon and it also serves to provide a flooring for the atrium 17. The bottom floor can be provided with tubing therein (preferably the tubing is embedded in the concrete slab that forms the bottom floor), for example in a meandering pattern, in order to provide a heat exchanger function with water surrounding the pontoon 2. The tubing in the bottom floor is connected with a heat pump that is part of the heating equipment 19 that is used to provide warm water for underfloor heating of the shipping containers and for providing warm water for sanitary purposes. The tubing in the bottom floor can also be connected to cooling equipment 23. The heat pump exploits the heat in the surrounding water. The heat pump can be connected to the tubing in the bottom floor or the heat pump can use the water surrounding the pontoon directly. The heat pump can be driven by solar energy from solar panels on the roof to the upper shipping containers 3. The housing unit can be provided with a battery or battery bank, located e.g. inside the pontoon.

The housing units 15 like apartments or studios are obtained by adapting an intermodal shipping container 3. In the shown embodiments 40 feet high long, 8 feet wide and 8 feet high intermodal containers have been used as the starting point for constructing the housing units 15. Alternatively, 20 feet long intermodal containers 3 could also have been used. The shipping containers 3 have been adapted by providing them with doors 4 and windows 5. In particular, the end walls at the longitudinal ends of the shipping containers 3 are provided with windows 5, i.e. the original doors at one longitudinal end of a shipping container are replaced by walls or windows. The complete and wall can be provided with glazing to provide a large window area by using a window frame that fits the end of the containers such a window 5 is easy to secure to the shipping containers 3. The sidewalls of the shipping containers 3 can also be provided with windows 5, and roof windows (is not shown) are also an option. As part of the adaptation process the shipping containers are locally reinforced to compensate for any weakening caused by the provision of doors and windows. The local reinforcement can be in the form of steel beams and the like. The conversion to living space is such that the shipping containers are still compatible with standard shipping containers so that the converted shipping containers can be shipped in the same way as standard shipping containers by train, truck (lorry) or ship.

The roof 21 of one or more shipping containers 3 can be configured be configured as a roof terrace 27 provided with a railing and a staircase 13 along the side of the container to provide access. A single shipping container 3 can be used to provide a single apartment our studio 15, or a single shipping container 3 can be divided into two studios (as shown in FIG. 4) two parts of two neighboring shipping containers 3 we used to form a single apartment (as shown in FIG. 6). Other variations in the division of studios and apartments and their distribution over various numbers of shipping containers 3 are also encompassed. Each studio/apartment 15 is provided with a kitchen unit and with a bathroom including shower and toilet. The door 4 of an apartment/studio 15 preferably opens to the atrium 17, either directly or via a corridor 12 that is arranged inside one or more shipping containers 3. The corridor 12 can be arranged to go through one or more shipping containers 3 to provide passage and access.

Figure 10:
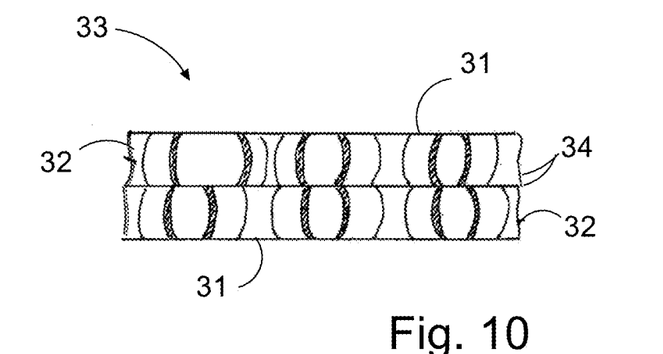
FIG. 10 is a cross-sectional view of insulation material that is used in the housing unit of FIG. 1.

Another measure for adapting the shipping containers 3 to housing purposes is the provision of insulation. Insulation is provided by applying reflective insulation sheets or panels 33 to the inner sides of the shipping containers 3. A cross-sectional view of such insulation sheets or panels 33 is shown in FIG. 10. The reflective insulation sheets or panels 33 have at least two reflective layers 31, one reflective layer 31 on each outer surface with another type of insulating material 34 sandwiched between the reflective layers 31. The other insulating material preferably being an air bubble film layer 32 and/or a plastic foam layer. The insulation layer may comprise a core layer of plastic foam with an air bubble layer on both sides of the core layer and a plurality of reflective layers, with at least a reflective layer on the outer sides. This type of insulating material is commercially available from Aluthermo NV, St. Vith, Belgium, under the product name Aluthermo® Quattro. This type of insulation material provides for an excellent heat insulation that requires minimum thickness thereby providing maximum usable space inside the shipping containers 3.

The shipping containers 3 are heated and preferably provided with floor heating, even more preferably water based underfloor floor heating.

Figure 11:
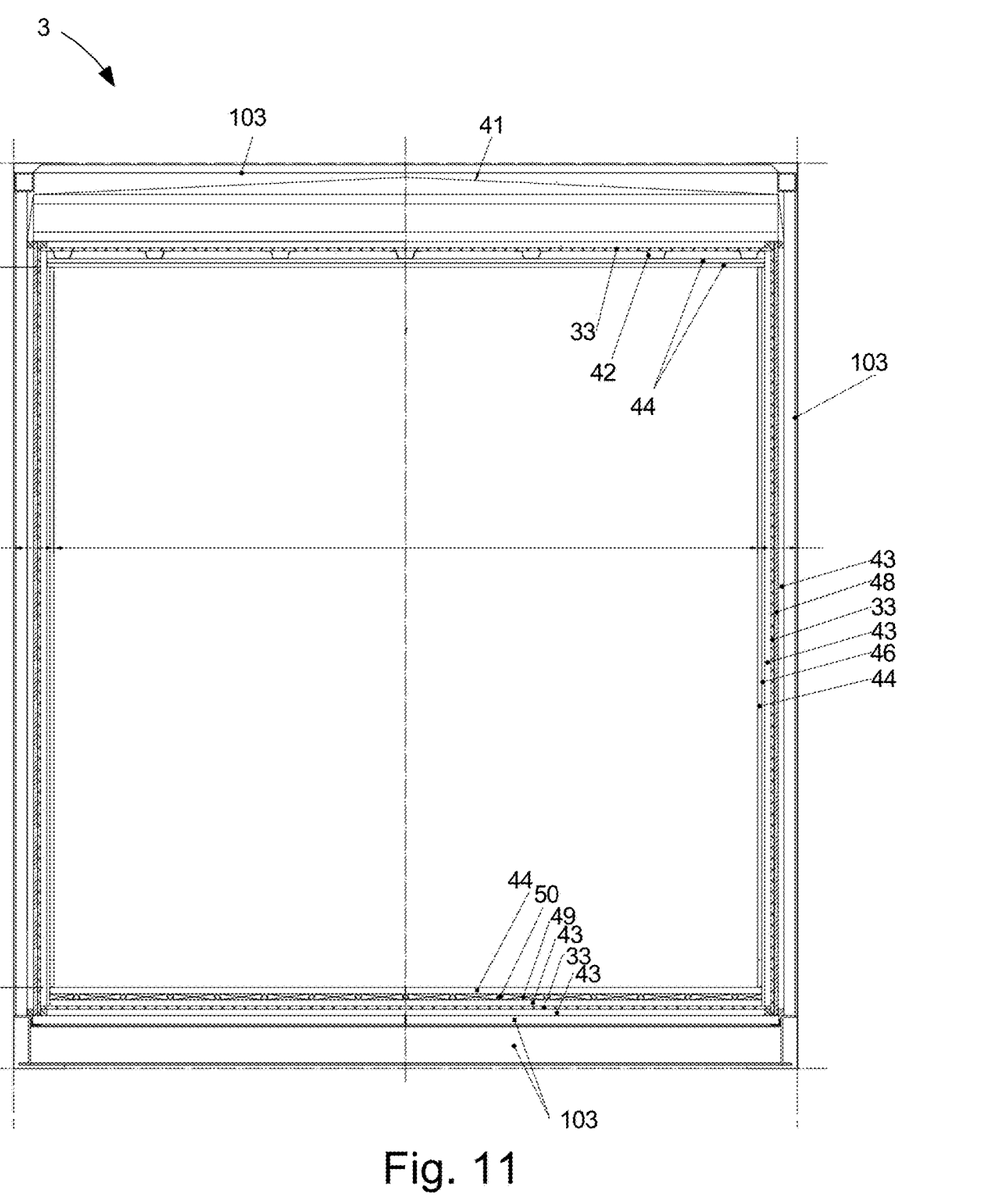
FIG. 11 is a cross-sectional view through an adapted shipping container.

FIG. 11 illustrates the insulation and inner walls, ceilings and flooring of a shipping container 3 that has been adapted to be habitable. The original container structure 103 has on its inner sides being lined with insulation panels or mats 33, including the floor to ceiling and sidewalls. The ceilings for the provided with a condensation screen 41 and with a hat profile 42 and is finished with plasterboards 44. The sidewalls are provided with transverse battens 43, acoustic stuff plasterboard 48, insulation panels 33, another layer of transverse battens 42, OSB (Oriented Strand Board) 46 and finished with plasterboard 44. With respect to the flooring, transverse battens 43 are placed on the original container structure 103. Insulation panels or mats 33 are placed on top of the transverse battens 43 and another layer of transverse battens 43 is placed on the insulation panels or mats 33. Chipboard panels 49 are placed on the last layer of transverse battens 43 and the chipboard panels 49 are provided with tubing (PEX) 50 in a meandering pattern for the underfloor heating. Floorboards placed on top of the chipboard panel. In the shown housing unit 1, three shipping containers 3 are placed on the flat top in a first polygon arrangement with an atrium 17 formed inside the first polygon arrangement, a triangle. A higher number of shipping containers 3 to can be used in the first polygon arrangement with a correspondingly higher number of sides, such as the square, a pentagon, hexagon or higher number polygon. The pontoon 2 has a polygon outline with number of sides equal to the number of sides of the first polygon arrangement. The shipping containers 3 in the first polygon arrangement partially protrude from the pontoon 2 and the outline of the first polygon arrangement is preferably larger than the outline of the pontoon 2. The shipping containers 3 of the first polygon arrangement are arranged with a space between them, preferably a space large enough to form a passage for person to pass in order to allow passages or doors to be formed that allow access to the atrium 17. Alternatively, the space can be used to form a window for providing view from the atrium 17 to the surrounding area.

Six shipping containers are placed on top the first polygon arrangement to form a second polygon arrangement. The second polygon arrangement is displaced relative to the first polygon arrangement (rotated relative to the first polygon arrangement by half of the angle between the sides of the polygon) to obtain a star shaped arrangement. The second polygon arrangement has the same number of sides as the first polygon arrangement. However, the second polygon arrangement preferably includes more shipping containers 3 than the first polygon arrangement, with even more preferably at least some of the shipping containers in the second polygon arrangement being placed side by side. The shipping containers 3 that are placed side-by-side share a common roof 21.

The atrium 17 is also extends inside the second polygon arrangement. The outer side of at least one of the shipping containers 3 of the second polygon arrangement that faces the atrium 17 is provided with an access balcony 16. A staircase 11 is arranged between the flat top (flooring) 25 and the access balcony 16. The access balcony 16 can extend along a plurality of shipping containers 3 of the second polygon arrangement. The access balcony 16 preferably including regular balcony areas 14, that interconnect the assess balconies 16 that extend along the individual shipping containers 3. Advantageously, these balcony areas 14 are located adjacent spacing between the corners of shipping containers 3 so as to provide a view from within the atrium 17 when located on a balcony area 14. Also, in the second polygon arrangement the space between the shipping containers is filled with a glazed wall or the like to provide a view to protect from the environment.

A door 5 in a shipping container 3 of the second polygon arrangement opens directly to the access balcony 16 or opens to a corridor 12 inside the container 3 that connects to the access balcony 16.

Preferably, the atrium 17 is covered by a cover 22. The cover 22 is preferably a (light) transparent cover or roof that even more preferably is at least partially openable in order to regulate the climate inside the atrium i.e. for ventilation purposes. Hereto, motorized openable panels (not shown) can be used.

Access to the housing unit 1 is provided by a gangway 6. The gangway 6 can be connected to the housing unit 1 at the level of the first polygon arrangement and/or at the level of the second polygon arrangement. The gangway 6 can connect at the opening between two shipping containers 3 or that the corridor 12 that goes through one or more shipping containers 3.

As shown for example in FIG. 5, heating equipment 19 and/or cooling equipment 23 and/or sanitary equipment 18 that is connected to the housing units inside the shipping containers 3 is located in a machine room 8 in the pontoon 2.

The other rooms 8 in the pontoon 2 can be used for storage. Connections form the equipment 18,19,23 in the pontoon to the shipping containers 3 on the pontoon 2 are also provided.

Figure 7:
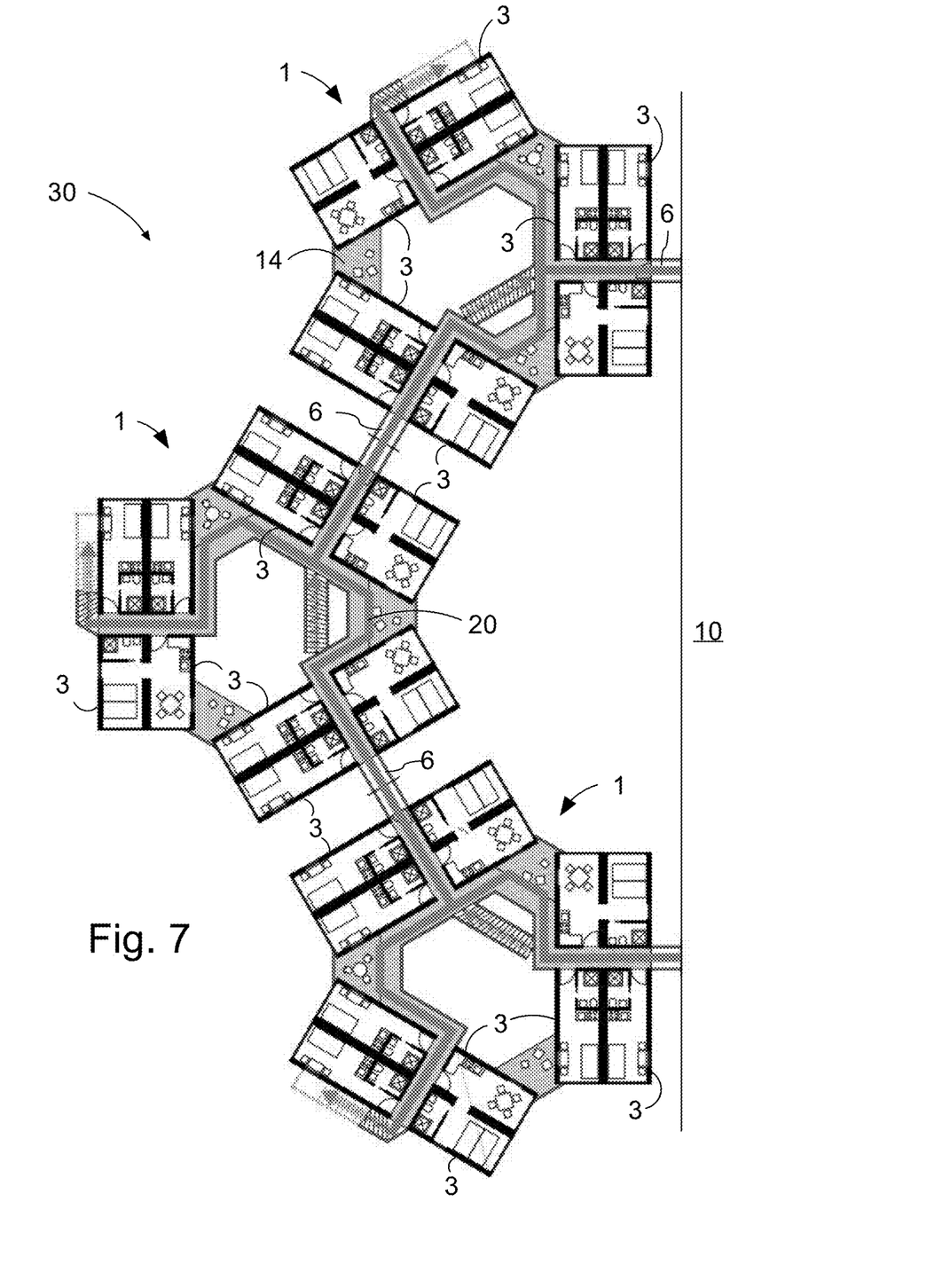
FIG. 7 is another top view of an arrangement including a plurality of interconnected housing units of FIG. 1 near a shore.

FIGS. 3 and 7 illustrate housing arrangement 30 that includes a plurality of interconnected floating pontoons 2 with a plurality of shipping containers (3) arranged on each of the pontoons 2. The shipping containers 3 have been adapted to be habitable, i.e. suitable as living space by providing at least one door 5 and at least one window 4 in the shipping containers 3 and by insulating the walls of the shipping containers 3, similar to the housing unit described above.

All pontoons 2 have an identical polygon outline and size and the pontoons 2 are interconnected by gangways 6. At least one of the pontoons 2 is provided with a gangway 6 for connection to shore 10. At least several of the pontoons 2 are provided with paths interconnecting the gangways 6 so as to form a pathway 20 or pathway system that connects each of the pontoons 2 to shore 10. At least a portion of the pathway 20 can be part of atria 17 formed on each pontoon 2 inside the first polygon arrangement.

Figure 8:
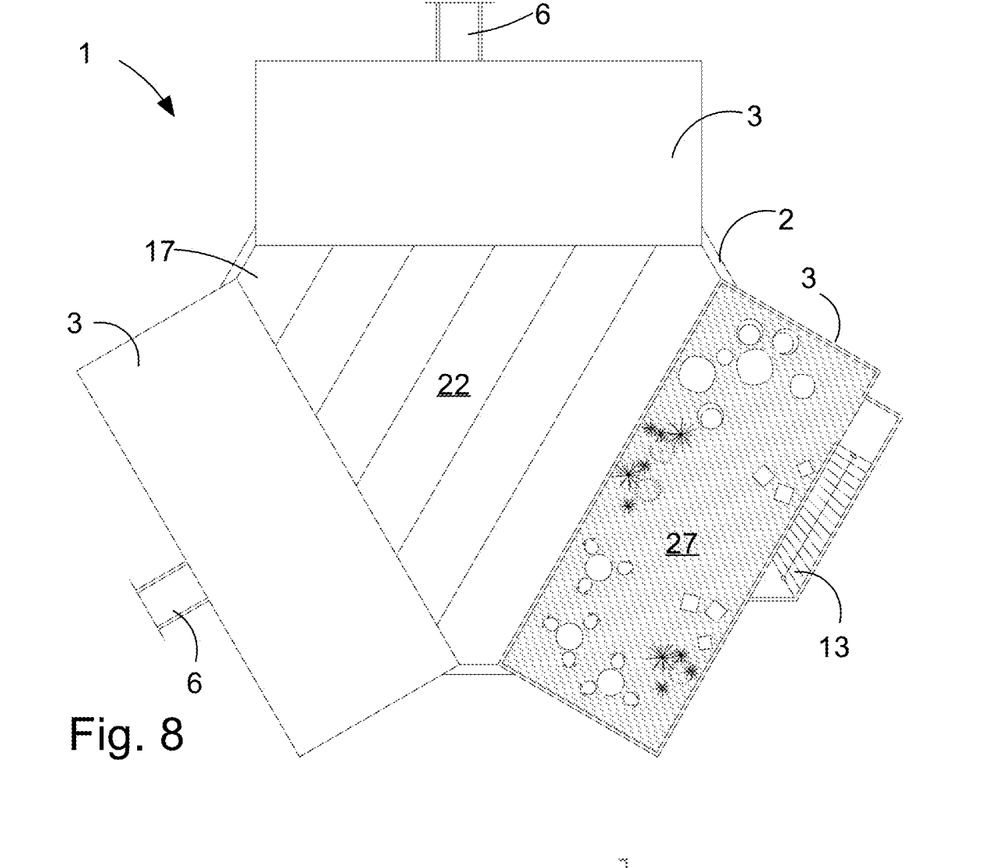
FIG. 8 is another top sectional view of the housing unit of FIG. 1.

FIG. 8 illustrates a slightly different version of the housing unit 1 that includes only a single layer of shipping containers 3 on the pontoon 2. Otherwise, this housing unit 1 is essentially identical to the housing unit described above.

Figure 9:
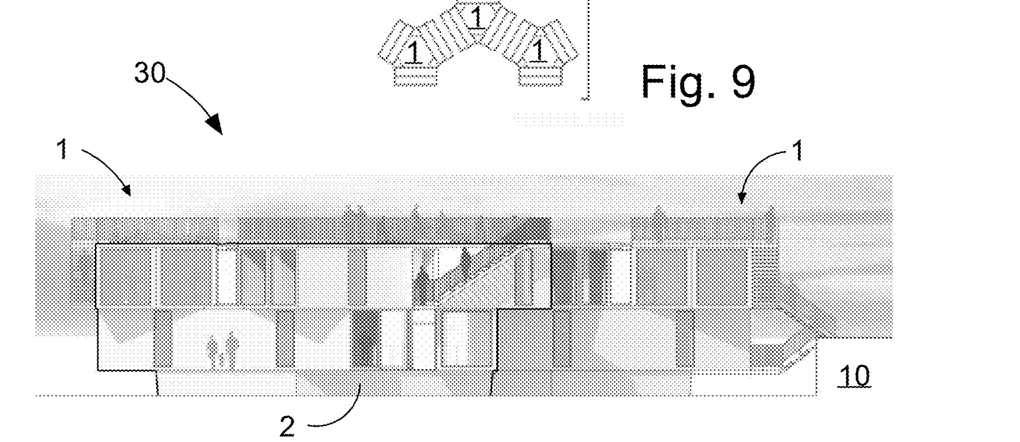
FIG. 9 is a side view of an arrangement including several interconnected housing units of FIG. 1.

FIG. 9 illustrates a housing arrangement 30 that includes three housing units 1 in an exemplary arrangement close to shore 10.

Each housing unit 1 can be provided with its own controller that controls e.g. the heating and/or cooling equipment. Alternatively, a central controller that is placed in one of the housing units 1 or that is remotely placed controls the equipment in an arrangement that comprises a plurality of housing units 1.

Although the teaching of this application has been described in detail for purpose of illustration, it is understood that such detail is solely for that purpose, and variations can be made therein by those skilled in the art without departing from the scope of the teaching of this application. The term "comprising" as used in the claims does not exclude other elements or steps. The term "a" or "an" as used in the claims does not exclude a plurality. The mere fact that certain measures are recited in mutually different dependent claims does not indicate that a combination of these measured cannot be used to advantage. The reference signs used in the claims shall not be construed as limiting the scope.

The invention claimed is:

1. A housing arrangement for floating on water, said housing arrangement comprising:
   a plurality of interconnected pontoons, said pontoons have a polygon outline,
   a plurality of shipping containers arranged on each of said pontoons, said shipping containers being adapted to be habitable by providing at least one door and at least one window in the shipping containers and by insulating walls of the shipping containers, and a plurality of gangways interconnecting said pontoons, wherein each pontoon has three or more of said shipping containers placed thereon in a first polygon arrangement with an atrium formed inside said first polygon arrangement, at least a portion of a pathway being part of atria formed on each pontoon inside said first polygon arrangement.

2. The housing arrangement according to claim 1, wherein at least one of said pontoons is provided with a gangway for connection to shore.

3. A housing arrangement according to claim 2, wherein at least several of the pontoons are provided with paths interconnecting the gangways so as to form pathway or pathway system that connects each of the pontoons to shore.

4. The housing arrangement according to claim 1, wherein said pontoons have a flat top and wherein said pontoons have a plurality of flat sides giving said pontoons a pentagon or a hexagon shaped outline.

5. The housing arrangement according to claim 4, with said plurality of shipping containers being arranged on a flat top of said pontoon.

6. The housing arrangement according to claim 4, wherein said pontoons have an identical polygon outline.

7. A housing unit for floating on water, said housing unit comprising:

a single pontoon formed by a single hollow body with a flat top, said single hollow body forming an interior, said interior being accessible and comprising at least one room for domestic activity, said single pontoon having a plurality of flat sides giving said single pontoon a pentagon or a hexagon shaped outline in plan view, three or more shipping containers arranged on said flat top of the single pontoon, said three or more shipping containers configured to be habitable by providing at least one door and at least one window in said three or more shipping containers and by insulating said three or more shipping containers.

8. The housing unit according to claim 7, wherein inner sides of walls, roof and/or floor of said shipping containers are insulated using reflective insulation sheets or panels that comprise at least two reflective layers, one reflective layer on each outer surface with another type of insulating material sandwiched between said reflective layers.

9. The housing unit according to claim 8, wherein said other insulating material being an air bubble film layer and/or a plastic foam layer.

10. The housing unit according to claim 7, further comprising a heat pump heat exchanging with the water surrounding the pontoon, directly or indirectly.

11. The housing unit according to claim 7, wherein said pontoon comprises a staircase accessible through an opening in said flat top.

12. The housing unit according to claim 7, wherein inner sides of one or more of walls, roof and floor of said three or more shipping containers are insulated by reflective insulation sheets or panels applied to the inner sides of the three or more shipping containers, said reflective insulation sheets or panels comprising at least two reflective layers, one reflective layer on each of the outer surface with another type of insulating material sandwiched between said at least two reflective layers.

13. The housing unit according to claim 12, wherein the another type of insulating material is one or more of an air bubble film layer and a plastic foam layer.

14. The housing unit according to claim 12, wherein the insulation comprises a core layer of plastic foam with an air bubble layer on both sides of the core layer and a plurality of reflective layers, with at least a reflective layer on the outer sides.

15. The housing unit according to claim 7, wherein the three or more shipping containers are provided with floor heating.

16. The housing unit according to claim 15, wherein said floor heating is a water based underfloor floor heating.

17. The housing unit according to claim 7, wherein said single pontoon has a flat bottom floor that serves as a floor for said at least one room for domestic activity.

18. The housing unit according to claim 7, wherein a top floor covers the flat top of the single pontoon, said top floor providing a flat top surface that supports said three or more shipping containers placed on the top floor.

\* \* \* \* \*